United States Patent [19]

Kurtin et al.

[11] Patent Number: 4,620,808
[45] Date of Patent: Nov. 4, 1986

[54] DISPLAY TYPEWRITER

[75] Inventors: Stephen Kurtin, Sherman Oaks; Dan L. McGurk, Hidden Hills; Daniel E. Fedele, Simi Valley; Edward C. Kelm, Pasadena, all of Calif.

[73] Assignee: Protype Corporation, Sun Valley, Calif.

[21] Appl. No.: 597,922

[22] Filed: Apr. 9, 1984

[51] Int. Cl.[4] .................................................. B41J 3/46
[52] U.S. Cl. ....................................... 400/83; 400/691; 248/282
[58] Field of Search ............... 400/691, 693, 488, 489, 400/479, 63, 83, 682, 66; 312/208; D14/111, 100, 106, 115; 248/218.4, 282, 442.2, 1 A, 1 B, 1 C, 1 E, 1 F, 1 H, 1 I, 1 J; 340/712

[56] References Cited

U.S. PATENT DOCUMENTS

| | | | |
|---|---|---|---|
| 2,048,313 | 7/1936 | Adolfson | 248/282 X |
| 2,306,209 | 12/1942 | Elofson et al. | 312/208 |
| 3,952,984 | 4/1976 | Dimitry | 248/282 |
| 3,990,565 | 11/1976 | Felton et al. | 400/83 X |
| 4,085,961 | 4/1978 | Brown | 248/282 X |
| 4,307,672 | 12/1981 | Shikimi | 248/282 X |
| 4,437,638 | 3/1984 | Scheibenpflug | 248/282 |

OTHER PUBLICATIONS

"Office Products Dealer" vol. 110, No. 6, Jun. 1982, p. 114.

*Primary Examiner*—Charles Pearson
*Attorney, Agent, or Firm*—Spensley Horn Jubas & Lubitz

[57] ABSTRACT

A text preparation system involving a packaging of the elements of a word processor in a typewriter-like configuration. The system includes a detachable keyboard positioned as in a conventional typewriter with the printer set on an angle so that the user can observe the positioning of the paper as is necessary when filling in preprinted forms. An electronic memory and video display unit are provided which allow text storage and editing prior to printing. The video display is supported by an articulated arm and the position and attitude of the video display can be locked using a single clamp.

4 Claims, 9 Drawing Figures

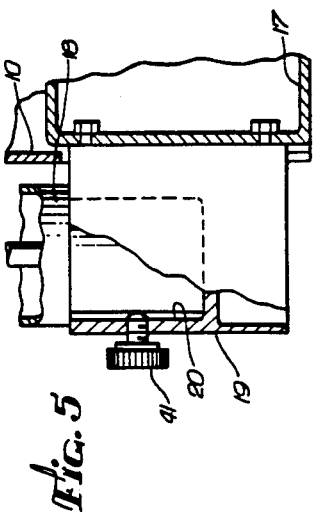
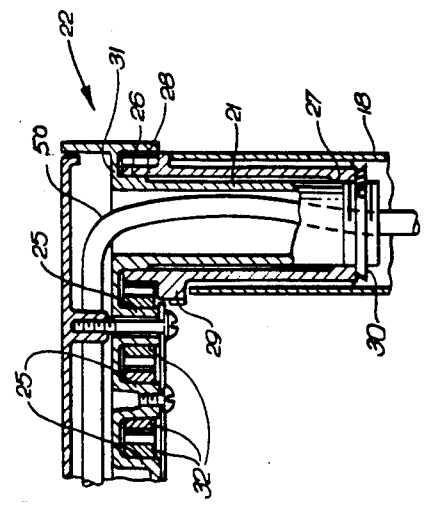
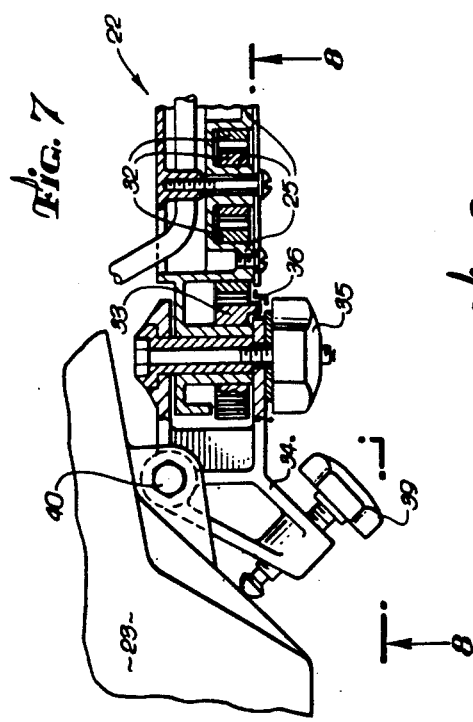
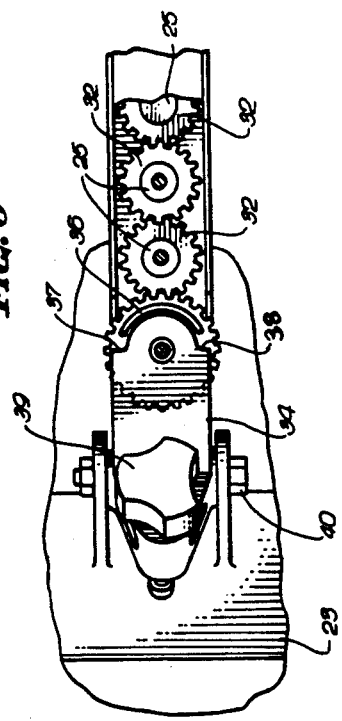

DISPLAY TYPEWRITER

BACKGROUND OF THE INVENTION

1. Field of Invention

This invention relates to electronic systems for text preparation.

2. Prior Art

Electronic systems for text preparation and editing are well known. Such systems, commonly known as "word processors", invariably include a keyboard, a video display, electronics, and a printer. Historically, however, such systems have generally lacked a convenient direct-to-paper typing mode, making the typing of forms, for example, very difficult. Prior art systems have also been far too large to fit in an office environment in the space typically available for an electric typewriter.

It is thus an object of the present invention to provide a versatile package of the elements typically included in a word processing system, in an arrangement that can be more fully utilized thereby forming a new class of system which may be referred to as a "Display Typewriter". The arrangement is typewriter-like in that, except for the addition of the video display unit, the package resembles a conventional typewriter, with the keyboard and the printing mechanism in their normal typewriter locations.

It is a further object of the present invention to provide a text preparation system which includes both a direct to paper typing mode and a video display/memory mode wherein text may be recorded in a memory which provides the opportunity for editing prior to printing on paper.

It is yet a further object of the present invention to provide a sloped mounting surface to support a printer so as to allow the user to view the actual printing function. This makes possible the filling in of preprinted forms, an impractical task using prior art word processing equipment.

It is still another object of the present invention to provide a detachable keyboard which can be removed from its typewriter height normal position on the display typewriter enclosure and placed elsewhere for typing, if more convenient.

It is a still further object of the present invention to provide an articulated support post assembly for a video display which enables the user to position the video display to the most convenient and comfortable position.

And yet another object of the present invention is to provide a locking means on the articulated support post assembly which allows the video display to be locked in position either during use or for transport.

A further yet object of the present invention is to provide a display typewriter with additional memory capability in the form of a "floppy disk".

SUMMARY OF THE INVENTION

The central element of the present invention is an electronics enclosure, the depth of which does not exceed about 18" (to allow it to be placed on the "return" of a standard secretarial desk) and which includes the following elements:

(1) a shelf extending from the front surface of the enclosure on which a removable keyboard is placed. The keyboard is connected to the electronics by means of a flexible cable which is stored in a channel under the keyboard when the keyboard is in place on its shelf;

(2) a sloping top surface designed to physically support any of several printers (the slope being steep enough to allow the user to easily view the action of the print head); and (3) an articulated post assembly having its lower end mounted to one of the rear corners of said enclosure, and having a support at its upper end which holds a small video display assembly.

By use of the novel package described above, all of the required hardware elements are accommodated in a commercially important "footprint", namely that of a conventional electric typewriter.

In use, the Display Typewriter includes a mode in which keystrokes are directly translated into printer activity, thereby simulating the operation of a conventional typewriter. In this mode, the positioning of the printer at an angle and directly behind the keyboard allows the printing function to be observed as in a conventional typewriter. This feature is of great importance to the utility of the system, particularly when filling out preprinted forms.

Alternatively, for those tasks for which it is appropriate, the user may choose not to activate the printer, but to instead record the text in a memory which is included in the electronics of the Display Typewriter. In this mode the text record is visually displayed on a video display so that it can be reviewed and edited prior to initiation of printer activity.

One of the embodiments of the Display Typewriter disclosed herein is intended to operate with any of several printers. This embodiment provides not only that a selection of printers can be physically accommodated, but also that by suitable modification of the electronics (as by plugging in an appropriate ROM) the operation of the Display Typewriter is altered so that its capabilities [possibly including display attributes] correspond to those of a given printer. Optional printer features, such as, for example, a correcting tape, may also activated. Function keys are provided on the keyboard which allow the various features to be accessed as desired.

BRIEF DESCRIPTION OF THE DRAWINGS

FIG. 5 is a partial view of the video display mounting post showing how the post is mounted.

FIG. 6 is a cross sectional view of the upper portion of the video display mounting post and a portion of the arm taken at 6—6 of FIG. 4.

FIG. 7 is a cross sectional view of the free end of the video display arm taken at 7—7 of FIG. 4. The video display unit has been removed, for clarity.

FIG. 8 is a bottom view of a portion of the video display arm with the top cover removed, taken at 8—8 of FIG. 7.

DETAILED DESCRIPTION OF THE INVENTION

Figure 1:
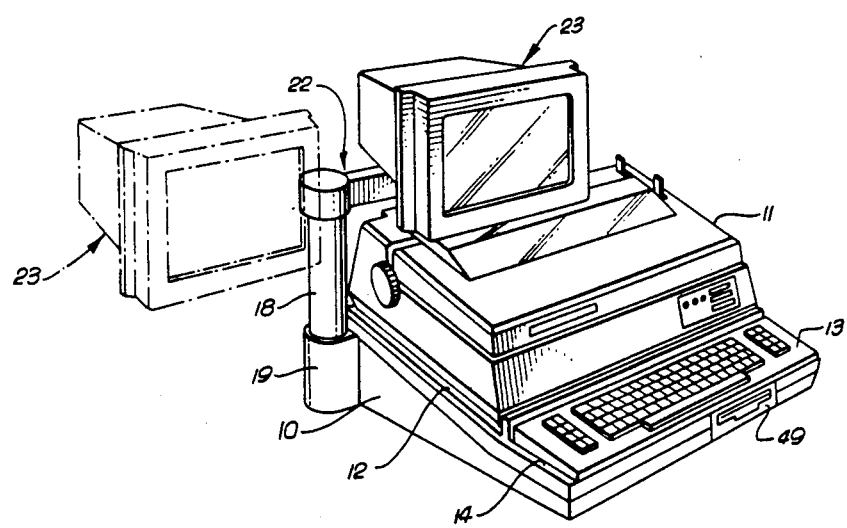
FIG. 1 is a perspective view of the invented Display Typewriter showing the video display mounted to the left side of the enclosure and the keyboard in place on its shelf.

FIG. 1 shows the electronic enclosure 10 of the present invention with a printer 11 resting on its top surface 12. The enclosure 10 may conveniently be made of plastic, but metal or other materials may be used if desired. The printer may be any one of a large number of printers available commercially which accept coded electronic signals and translate them into the mechanical action of a printing mechanism to cause alphanumeric symbols to appear on a printed page. A representative printer which is suitable for use with the present invention is one manufactured by JUKI, Model No. 6100.

The top surface 12 of the enclosure 10 is preferably about 13 inches deep by 20 inches wide so as to provide space for most standard printers. The surface 12 may be sloped at an angle of about 6 to 9 degrees which is sufficient to allow the user to observe the platen of most printers from his or her seat in typing position. While the optimum angle of slope depends upon the user's size and also on the configuration of printer, an angle of about 7.5 degrees is a good compromise which is satisfactory for use by most operators and with most printers. Particular circumstances may dictate that other slopes be used.

Figure 2:
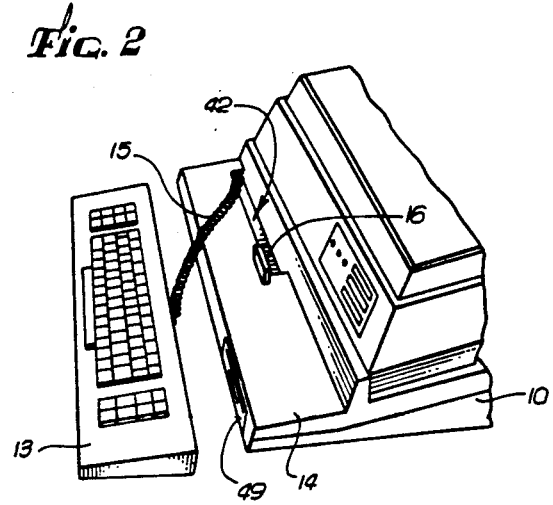
FIG. 2 is a perspective view of the front portion of the invented Display Typewriter showing the keyboard removed from its shelf.

A keyboard 13 which contains keys arranged in one of the standard typewriter patterns, and also keys for controlling the various functions of the Display Typewriter, is positioned on shelf 14 at the front of enclosure 10. Electrical connection is made through coiled cord 15. The cord is stored in channel 42 at the rear of the shelf when the keyboard is in place on the shelf. Tab 16, which projects from shelf 14 mates with a slot (not shown) on the underside of the keyboard to keep the keyboard from moving when it is positioned on the shelf. The height of shelf 14 and the thickness of the keyboard are selected so as to make the height of the typing surface of the keyboard proper for comfortable typing when the Display Typewriter is in place on the return of a standard secretarial desk. It should be noted that the height of detached computer keyboards are subject to governmental regulations in some cases (for example German DIN standards). These regulations generally provide for a lower keyboard height than is comfortable for most typists when such keyboard is placed on a typewriter stand or on the return of a secretarial desk. Thus shelf 14, which positions the keyboard at a comfortable typing height, i.e. approximately the height of conventional typewriter keyboards, is one feature of the present invention which permits the Display Typewriter to be used in place of the standard office typewriter. As can be seen in FIG. 2, the keyboard may optionally be used in a position other than on shelf 14, if desired. As a separate keyboard, governmental height regulations are met.

An opening 49 is provided on the front face of the Display Typewriter, below shelf 14, to receive a "floppy disk" type of memory device which may be optionally used to supplement a solid state memory located within chassis 17.

As previously mentioned, the printer used with the present invention may be any one of many printers available which perform similar overall functions, but which may have individual features and/or require particular wiring or inputs to function satisfactorily with the Display Typewriter described herein. In order to accomodate the various possible printers, an adapter 20 including appropriate ROMs and other circuitry which alters the wiring and/or programming of the electronics may be plugged into the Display Typewriter. An adapter 20 is shown plugged into the rear of enclosure 10, but it may, of course, be at any other desired location including, if desired, a location which is inaccessible to the user.

Figure 3:
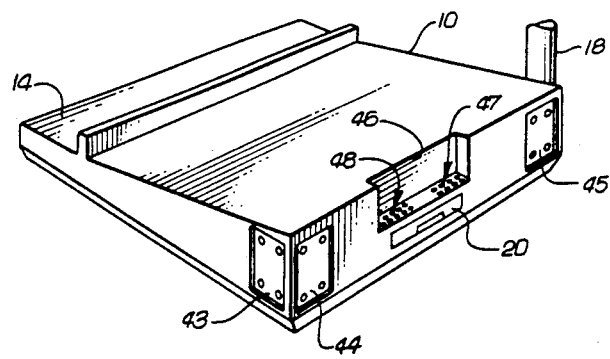
FIG. 3 is a rear perspective view of the enclosure without a printer, showing alternate mounting locations for the video display mounting post.

Enclosure 10 may be a plastic shell, inside of which is a metal chassis 17 which supports the internal electronic control circuitry and the video display assembly. A plurality of mounting locations for the video display mounting post 18 are preferably provided, allowing the Display Typewriter to be utilized irrespective of whether installed on a secretarial desk with right or left return or whether other space limitations exist. As shown in FIG. 1, the video display mounting post 18 is mounted on the left side at the rear of the Display Typewriter. However, mounting capability can, and preferably is, also provided at the right side rear, and on the rear of the unit at at least the left and right sides as shown at 43, 44, and 45 of FIG. 3. The chassis of each Display Typewriter is preferably predrilled to allow installation of the post 18 at any of the four locations metioned, the choice of locations used depending on the space available and the convenience of the operator.

Electrical connections to the video display unit are made by a flexible cable 50 from the unit 23 which may be plugged into a receptacle 47 located in a recess 46 at the rear of enclosure 10. Electrical connections to the printer may be made by plugging the printer into receptacle 48 located in the same recess.

At the lower end of post 18 is a mounting socket 19 which is secured to chassis 17. A bore 20 in the mounting socket 19 accepts post 18. Set screw 41 prevents post 18 from turning.

At the top of post 18 is a rotatable arm assembly 22 which supports the video display 23, allowing only limited rotation of the video display as will be described in more detail below. A spindle 21, which extends downward from one end of arm member 31, passes through post gear 28 and rotates in spaced sleeve bearings 26 and 27 at the top of post 18. Sleeve bearings 26 and 27 may conveniently be made integral with post gear 28. Washer 30 may be used to retain the arm assembly 22 from separating from post 18.

Post gear 28 rests on top of post 18 and is kept from turning by key 29. The post gear is coupled to the gear 33 at the free end of arm 22 by a train of five idler gears 32, all five gears in the train preferably having the same pitch diameter. Idler gears 32 run on axles 25 which project from member 31. Depending on the desired length of arm 22, there could be fewer or more idler gears 32, so long as the number is odd. If gears 28, 32 and 33 all had equal pitch diameters, the odd number of idler gears would result in gear 33 maintaining the same angular position relative to the Display Typewriter proper, irrespective of the position of arm 22. It is preferred, however, that gear 28 have a somewhat larger pitch diameter than gear 33. By proportioning the gear ratio properly, the video display will turn inward somewhat as its position is moved from directly over the printer to a side position thereby maintaining its front face facing the user. As one example of a suitable set of gear diameters, gear 28 could have a pitch diameter of 1.89 inches, gear 33 a pitch diameter of 1.67 inches, and gears 32 each with a pitch diametr of 1.11. Other combinations of gear diameters which will accomplish the same result could of course be selected.

Yoke 34 is free to rotate about the axis of gear 33 to a limited extent so long as clamp bolt 35 is not tightened. The extent to which yoke 34 can rotate is determined by the angular size of stop 36, which is a raised portion of gear 33, and the mating stops 37 and 38 on the upper web of yoke 34. Since gear 33 maintains the angular position of the video display vis a vis the operator irrespective of the motion of arm 22, the limits on the angular position of video display 23 due to stops 36, 37, and 38 is fixed relative to the operator and is independent of the motion of the arm.

The size of stop 36 on gear 33 relative to stops 37 and 38 is preferably such that video display 23 can be adjusted horizontally over a range of about 20°. The purpose in so limiting the rotation of the video display is to prevent the possibility of continuous rotation of the display unit which could result in failure of the connecting cable. Another purpose is to prevent the display unit from rotating out of reach of the user when the display unit is pushed to the side. This would require the user to stretch uncomfortably to retrieve it.

Tightening clamp bolt 35 not only locks the rotation of yoke 34, but also prevents arm 22 from rotating about post 18. The position and angle of the video display are thus simultaneously locked by the action of clamp bolt 35.

The locking of the video display by clamp bolt 35 is useful not only to secure the position of the video display in use, but also when the unit is moved from one location to another.

Initial setting of the rotational position of video display 23 may be accomplished by locking the display with clamp bolt 35, loosening set screw 41 which unlocks post 18 from socket 19 (allowing post 18 to rotate), turning the video display to the desired direction, and retightening set screw 41. Video display 23 can then be adjusted within its limited range by loosening clamp bolt 35.

Vertical positioning of the video display 23 is accomplished by adjustment of tilt screw 39 which causes the video display to rotate in a vertical plane about hinge pin 40. The video display cabinet need not be anchored to tilt screw 39 since its center of gravity is substantially forward of hinge pin 40, and gravity will keep the display firmly against the end of tilt screw 39.

Figure 9:
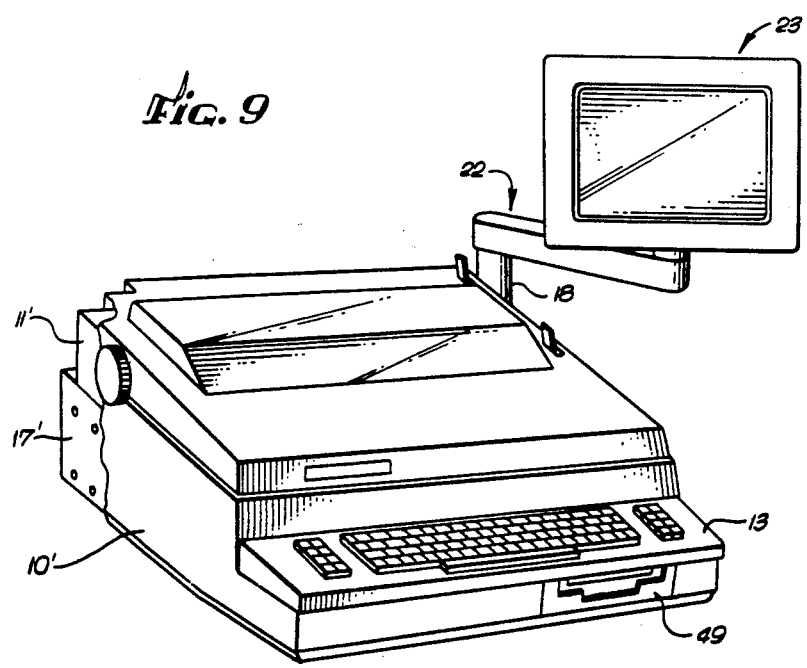
FIG. 9 is a perspective view of a second embodiment of the present invention with a portion of the enclosure broken away so that the relationship between the chassis and a printer mechanism can be seen.
Figure 4:
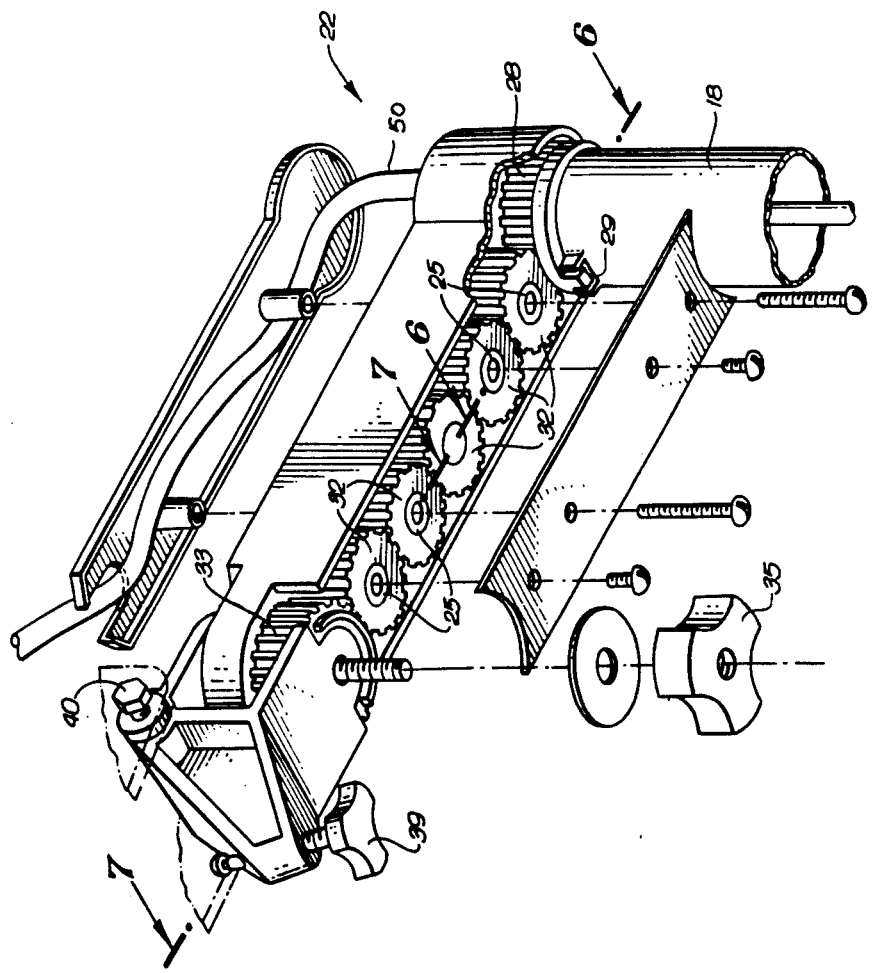
FIG. 4 an oblique view of the video display arm with its top and bottom covers shown separated for clarity.

The first preferred embodiment of the present invention, as shown in FIGS. 1-8 and described above, involves the use of an independently packaged printer unit 11 which rests on the sloped top surface 12 of enclosure 10. Within the spirit of the invention, however, a printer unit which is not independently packaged may be used. In this connection, a second preferred embodiment of the invention which includes a common enclosure for the printer and the control circuitry is shown in FIG. 9. In FIG. 9 the enclosure 10 is shown partially broken away so that the chassis 17' which supports printer mechanism 11' may be seen. Chassis 17' supports the printer in a sloped fashion as previously described so that the operator will have a view of the printing action. Except for the use of a single enclosure housing the printer and control electronics, as shown in FIG. 9, the embodiments of FIGS. 1 and 9 are the same and the previous description describing the embodiment of FIGS. 1-8 is applicable to the embodiment of FIG. 9.

What has been described is a novel package for an electronic text preparation system which allows the system to be used in place of a standard office typewriter. It will be understood that various modifications within the spirit of the invention will readily occur to those skilled in the art and these modifications are intended to be covered by the following claims:

We claim:

1. In a text preparation system which includes a keyboard, electronic processing circuitry, a printer, and video display means, the improvement which comprises:

an enclosure for containing said electronic processing circuitry, said enclosure having a sloping top for holding said printer whereby an operator may view the printing function of said printer while seated in position to operate said keyboard, said enclosure having a keyboard support for supporting said keyboard at a predetermined height; and means for movably supporting said video display means whereby said video display may be positioned at a convenient location and angle with respect to the operator comprising a vertical post mountable at any one of a plurality of positions adjacent said enclosure; an arm rotatably mounted to the top of said post; means for mounting said video display at the free end of said arm; means limiting the rotation of said video display in a horizontal plane; and means for rendering the limits of said rotation of said video display relative to said arm dependent on the position of said arm, said means for rendering the limits of rotation of said video display dependent on the position of said arm comprising a train of gears coupling said post to said rotation limiting means.

2. A text preparation system improvement as recited in claim 1 and further including clamping means for simultaneously preventing rotation of said video display and one of the gears in said term of gears relative to said arm.

3. A text preparation system as recited in claim 1 and further including locking means for preventing the rotation of one of the gears in said train of gears with respect to said arm whereby the rotation of said arm with respect to said base unit is prevented.

4. A text preparation system as recited in claim 3 where said locking means also prevents the rotation of said video display unit with respect to said arm.

* * * * *